Patented May 5, 1925.

UNITED STATES PATENT OFFICE.

ALEXANDER NATHANSOHN, OF BAD HARZBURG, GERMANY.

PROCESS FOR THE RECOVERY OF ZINC COMPOUNDS FROM ZINC-CHLORIDE SOLUTIONS.

No Drawing.   Application filed March 7, 1924.   Serial No. 697,538.

*To all whom it may concern:*

Be it known that I, ALEXANDER NATHANSOHN, a citizen of Germany, residing at 6 Goslarsche Street, Bad Harzburg, Germany, have invented certain new and useful Improvement in Process for the Recovery of Zinc Compounds from Zinc-Chloride Solutions, of which the following is a specification.

The object of the present invention is to obtain the zinc values in solutions of zinc chloride or in mixtures containing zinc or zinc chlorides such as the products known in the trade as sal-ammoniac slags.

An economical method of recovering the zinc values in zinc chloride solutions has long been sought and it is believed the solution of this problem is found in the present invention. It has already been proposed to precipitate solutions of zinc chloride with ordinary lime (calcium hydroxide) but the precipitate obtained by this procedure is filterable with difficulty and contains large amounts of chlorine which can not be readily removed by repeated treatment with lime.

An alternative method treats the precipitate obtained by the action of lime on zinc chloride solutions with calcium sulphate. This gives a zinc precipitate free from chlorine but has the objection that it also contains basic zinc sulphate and requires a high temperature for the ultimate recovery of the zinc present in the precipitate.

The present process consists in precipitating zinc chloride solutions with lime and introducing into the liquid containing the precipitate of zinc hydroxide in suspension, carbon dioxide. By treatment with the carbon dioxide carbonate of zinc is formed which gives a precipitate which is readily filterable and from which all the chlorine may be removed by washing with water. The treatment with carbon dioxide should be continued until all of the hydroxides present in the precipitate have been transformed into carbonates, which point may be determined by the disappearance of the basic reaction of the mixture. The precipitate should then be washed with water until all chlorides have been removed and after having been dried or calcined, may then be treated metallurgically to obtain the zinc values therein.

In practice the carbon dioxide used in this process may be obtained by calcining calcium carbonate or by the use of any gases containing carbon dioxide in suitable quantities such as waste combustion gases.

The present process is especially suitable for the treatment of so-called sal-ammoniac slags. The slags are ground and water is then added so that a suspension of the ground slags is formed. To this liquid sufficient lime is added to transform the zinc chloride present into zinc hydroxide and when this transformation is complete, carbon dioxide gas is introduced into the mixture to form zinc carbonate. The precipitate formed is filtered off, is washed and then may be treated in any suitable manner for the recovery of the zinc values therein.

I am aware that it has already been proposed to treat zinc chloride solutions with calcium carbonate but this process is very incomplete at ordinary temperatures and even with the assistance of heat is unsatisfactory, whereas the present process will work satisfactorily at ordinary temperatures. Sufficient lime should be added so that zinc oxychloride is formed which is then treated with carbon dioxide.

A working example of my improved process is as follows:—

A ton of zinc chloride solution containing 90 kilograms of zinc is treated with an equivalent amount of milk of lime containing 200 kilograms calcium hydroxide per ton. The end of the reaction may be noted when the filtrate from the mixture is free from zinc and slightly alkaline. Then carbon dioxide from any suitable source is introduced until two thirds of the zinc hydroxide present is saturated with carbonic acid. The end of the reaction may be noted by the fact that the amount of chlorine in the mixture and in the filtrate is identical which shows that the precipitate is free from chlorine. The precipitate is washed until all traces of chlorine have been removed.

Having thus fully explained my invention, what I claim is:

1. The process of recovering zinc values from zinc chloride solutions which consists in precipitating such solutions with lime and introducing carbon dioxide into the mixture.

2. A process of recovering zinc values from waste products containing zinc which consists in grinding such products, suspending the powder in water, precipitating the suspension with lime and introducing carbon dioxide into the mixture.

3. The process of recovering zinc values from waste products containing zinc by treating said products in contact with water with lime and subjecting the resultant precitate to the action of carbon dioxide.

4. The process of recovering zinc values from products containing zinc by treating such zinc products with lime in contact with water, subjecting the resultant precipitate to the action of carbon dioxide so as to convert said precipitate into zinc carbonate and washing said zinc carbonate until it is free from chlorine.

In testimony whereof I hereunto affix my signature.

ALEXANDER NATHANSOHN.